United States Patent [19]
Puri

[11] Patent Number: 4,863,761
[45] Date of Patent: Sep. 5, 1989

[54] CONTINUOUS PROCESS FOR MAKING COATED COMPOSITE HOLLOW FIBER MEMBRANES

[75] Inventor: Pushpinder S. Puri, Macungie, Pa.

[73] Assignee: Air Products and Chemicals, Inc., Allentown, Pa.

[21] Appl. No.: 159,627

[22] Filed: Feb. 23, 1988

[51] Int. Cl.⁴ .................... B05D 3/02; B05D 3/12; B05D 5/00; B05D 1/18

[52] U.S. Cl. .................... 427/175; 427/177; 427/245; 427/358; 427/378; 427/379; 427/393.5; 427/412.1; 427/434.7

[58] Field of Search ............... 427/175, 177, 245, 246, 427/358, 378, 379, 393.5, 412.1; 118/DIG. 18

[56] References Cited

U.S. PATENT DOCUMENTS

| | | | |
|---|---|---|---|
| 4,214,020 | 7/1980 | Ward et al. | 427/296 |
| 4,230,463 | 10/1980 | Henis et al. | 427/245 X |
| 4,444,662 | 4/1984 | Conover | 210/500.2 |
| 4,467,001 | 8/1984 | Coplan et al. | 427/434.6 |
| 4,579,079 | 4/1986 | Nundy | 118/405 |

*Primary Examiner*—Evan Lawrence
*Attorney, Agent, or Firm*—Mark L. Rodgers; William F. Marsh; James C. Simmons

[57] ABSTRACT

The present invention is a process for applying a semipermeable coating on a hollow fiber substrate. The hollow fiber substrate is continuously passed through a polymeric coating solution and withdrawn from the solution through a coating die to form a uniform polymeric solution coating on the outer surface of the hollow fiber. The coated hollow fiber is dried by passing it through a convective flow tunnel in which the rate of drying is controlled both by a pre-determined temperature profile in the tunnel and by a controlled air flow rate through the tunnel. The resultant material is a semipermeable, coated composite hollow fiber membrane which can be used in gas and/or liquid separations.

17 Claims, 1 Drawing Sheet

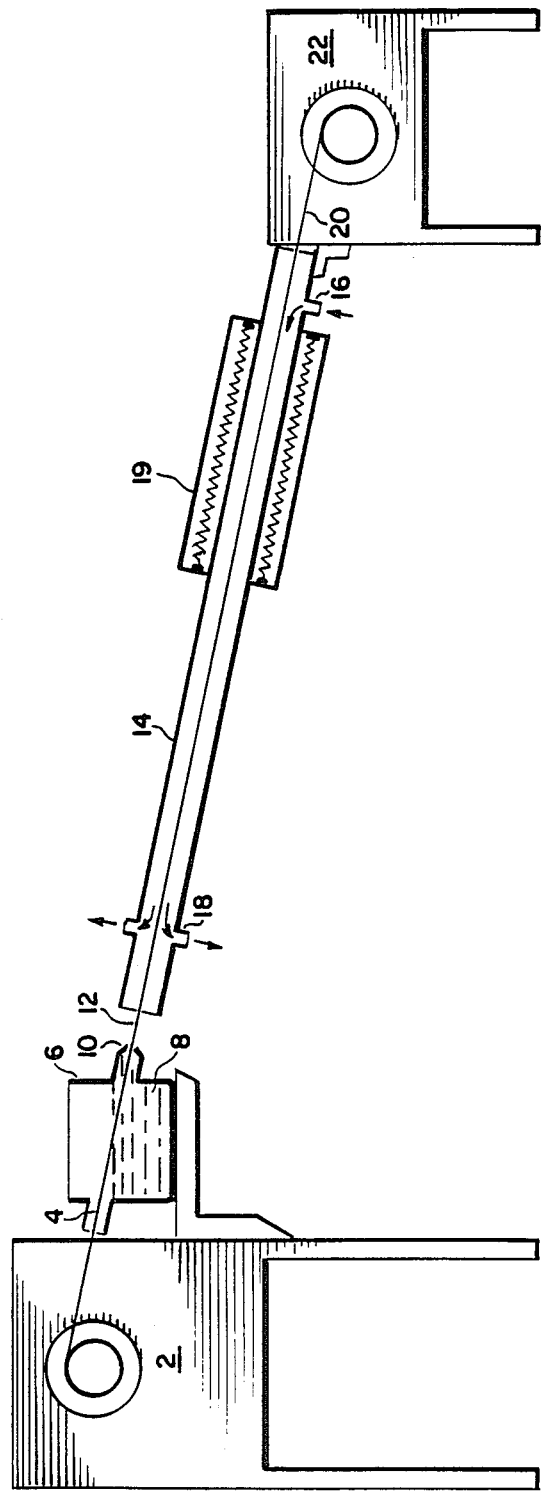

CONTINUOUS PROCESS FOR MAKING COATED COMPOSITE HOLLOW FIBER MEMBRANES

TECHNICAL FIELD

The present invention relates to applying highly permeable coatings on hollow fiber substrates to form composite membranes.

BACKGROUND OF THE INVENTION

The coating of hollow fiber substrates with a polymer to make a composite membrane structure has generally been achieved by immersing the hollow fiber substrate in a pool of low viscosity and generally very dilute solution of a polymer in a volatile solvent. The hollow fiber substrate is then withdrawn and air-dried to form a film. Low viscosity coating solutions are typically used because high viscosity solutions tend to form non-uniform coatings on the substrate surface. When low viscosity solutions are used for coatings, the polymer concentration is not large enough to form a continuous film on a substrate with high porosity and large pore sizes due to shrinkage of the polymer coating. To achieve a good film, the substrate must be coated several times in succession or a vacuum must be applied on the bore side of the substrate so that by loss of solvent in the vicinity of the membrane wall, an increased solution concentration (and, hence viscosity) is obtained to form a desired film. The multiple coating approach yields films that are very thick and offers substantial resistance to mass transfer of the permeating component. In the vacuum method, thin coatings are achieved; however, this method must be practiced in a batch mode because discrete sections of fibers must be used to achieve vacuum through the bore. Both of the above methods fail to give uniform coatings when polymeric solutions having high viscosity and low solid contents are used.

U.S. Pat. No. 4,214,020 discloses a process for coating the exteriors of a plurality of hollow fibers which are suitable for fluid separations and which are assembled in the form of a bundle. The process involves immersing the bundle of hollow fibers in a coating liquid containing material suitable for forming the coating and a substantial amount of solvent. A pressure drop from the exteriors to the interiors of the hollow fibers is provided to result in the formation of deposits on the exteriors of the hollow fibers. The process enables essentially the entire exterior surface of the hollow fibers to be coated without undue sticking of the hollow fibers and avoids the formation of undesirably thick coatings on the hollow fibers in any portion of the bundle. While the disclosed process is capable of treating a bundle of fibers simultaneously, the process nonetheless is still a batch process, and is not operated as a continuous, on-line process.

U.S. Pat. No. 4,444,662 discloses a laminate formed by the solvent casting of a two-phase siloxane-polyarylene polyether block copolymer onto a suitable microporous substrate, such as a microporous propylene film, to produce a gas permeable and blood compatible membrane having sufficient mechanical strength for use in blood oxygenators and gas separation devices. The process for producing the laminate consists of a meniscus dip coating technique to apply a uniform coating of the polymer to only one side of the microporous substrate in order to maintain adequate coating thickness and to leave the other side uncoated for ease of heat sealing or potting of the membranes together into envelopes.

SUMMARY OF THE INVENTION

The present invention is a continuous process for applying a generally uniform, semi-permeable coating on a hollow fiber substrate to produce a composite hollow fiber membrane. The process comprises passing a hollow fiber substrate, at fixed tension and fixed speed, into a polymeric solution capable of forming a permeable coating on the hollow fiber substrate. The hollow fiber substrate is then removed from the polymeric solution by axially drawing it through a coating die such that a polymer solution coating is formed on the substrate surface by axial annular drag flow. The coated hollow fiber is subsequently dried by passing it through a convective flow tunnel in which the rate of drying is controlled both by a pre-determined temperature profile in the tunnel and by a controlled air flow rate through the tunnel. Initially the coated hollow fiber undergoes low temperature drying (pre-drying) in the convective flow tunnel by contact with a gas stream, typically air, flowing through the tunnel. Subsequently, the coated hollow fiber undergoes drying and annealing at high tempratures in a second portion of the convective flow tunnel in which the temperature is regulated by some type of heating device, such as an oven.

The present invention provides for continuously coating hollow fiber substrates at a given speed and pre-determined tension to produce essentially defect-free, semi-permeable, coated composite membranes. Additionally, the present invention has the ability to form defect-free coating layers over the external surface of the hollow fibers using high viscosity solutions with low solids contents. The total coating thickness can be controlled by simply changing the mechanical design of the coating die.

BRIEF DESCRIPTION OF THE DRAWING

The single FIGURE of the accompanying drawing is a schematic diagram for carying out one embodiment of the present invention.

DETAILED DESCRIPTION OF THE INVENTION

The present invention is a process for applying a semi-permeable coating on a hollow fiber substrate to produce a composite hollow fiber membrane. Referring to the single figure of the accompanying drawing, a hollow fiber substrate 4 is continuously unwound from a delivery spool mechanism 2 and taken up on a receiving spool mechanism 22 at a predetermined, fixed tension and a pre-determined fixed speed. By regulating the tension and the speed, a fixed tension differential results in the fiber substrate during the coating process which is essential to compensate for substrate swelling due to solvent absorption when the membrane is immersed in the polymer solution, and substrate and coating film shrinkage caused by the loss of solvent upon drying. The hollow fiber substrate can be any suitable material which can be a component of a composite membrane, and is preferably a microporous polymeric material such as CELGARD ® fibers available from the Hoescht-Celanese Corporation.

As the hollow fiber substrate 4 is unwound from the delivery spool mechanism 2, it is passed into a reservoir 6 containing a polymeric solution 8 capable of forming a permeable coating on the hollow fiber substrate 4. The polymeric solution 8 can be any solution which does not adversely react with or affect the fiber. It is preferred that the polymeric solution have a low solids concentration, i.e., less than 15% and have a viscosity within the range of 100–25,000 centipoises at room temperature, although these parameters are not critical to the operation of this invention. Particularly well suited polymeric solutions include one or more solvents containing polymeric materials selected from the group consisting of polysulfones, polyacrylonitriles, polycarbonates, polyarylethers, polyolefins, polyacetylenes and substituted derivatives thereof. Generally, however, any polymer solution (i.e. polymer dope) which can result in a semi-permeable coating can be used in this process.

The hollow fiber 4 is passed through the polymeric solution 8 contained in the reservoir 6, and is removed from the solution 8 by axially drawing it through a coating die or jet 10 in fluid communication with the reservoir 6 and containing the polymeric solution 8. The motion of the hollow fiber entrains the polymer solution 8 and draws it through the die 10 thus causing an axial annular drag flow resulting in a uniform polymer coating on the surface of the hollow fiber. Generally, the thickness of the polymer solution coating can be determined by knowing the ratio of the diameter of the hollow fiber to the orifice opening of the coating die 10 and the power law index of the polymer solution. Although the thickness of the coating on the hollow fiber substrate is not critical, a thickness between 0.1–100 microns is generally preferred. In addition to being pased through the solution itself, the polymeric solution coating may be applied to the hollow fiber substrate by a number of equivalent techniques, for example, by a metered pump device, by a spray mechanism, etc., prior to being passed through the die. The important criteria in the application of the coating solution is that the solution is applied in sufficient amount to the total outer surface of the substrate.

The coated hollow fiber 12 is dried by passing through a convective flow tunnel 14. The rate of drying within the convective flow tunnel 14 is controlled, in part, by a predetermined temperature profile maintained by a heating device 19, such as an oven, encasing a downstream portion of the tunnel 14, which is preset and regulated so as to maintain the desired temperature within the tunnel 14. In addition to the heating device 19, the rate of drying is also controlled by passing a gas stream, preferably air, through the tunnel 14. The gas stream enters the tunnel 14 through inlet 16 and is preferably passed counter-directional to the hollow fiber, and is withdrawn from the tunnel 14 through one or more outlets 18. The inlet 16 is typically positioned such that the air stream passes through the section of the tunnel 14 which is encased by the heating device 19, such that the air stream is heated to better aid in drying the membrane. Low temperature drying, or pre-drying, occurs in the upstream portion of the tunnel 14 by contact of the coated hollow fiber with the heated air stream. As the hollow fiber passes through the tunnel 14, it undergoes final drying and annealing at high temperatures in the downstream portion of the tunnel by the combined action of the heating device 19 encasing that portion of the tunnel, and the air stream also flowing through this downstream section. In a preferred embodiment the flow of gas through the tunnel 14 is aided by a vacuum device connected to the outlet 18. The controlled drying process enables the formation of a coating on the hollow fiber substrate which has no surface cracks or stresses and where no delamination occurs between the substrate and the coating.

The coated hollow fiber 20 is removed from the tunnel 14 and wound onto a take-up spool via a take-up spool mechanism 22. In other embodiments of the present invention, multiple polymer reservoirs and associated coating dies can be used in series to apply multiple coating layers on the hollow fiber in a continuous manner. Each successive coating die should have an equal or larger diameter such that subsequent coatings are applied over prior coatings. Each polymer reservoir may have the same polymer solution, or polymer solutions and/or concentrations may be varied to form different coatings on a single hollow fiber. The drying step may be carried out subsequent to applying all of the coating layers, or each layer may be dried immediately after it is applied, prior to applying a subsequent coating.

Such embodiments for applying multiple coatings are not shown in the drawings since one of ordinary skill in the art would readily understand how to practice such embodiments from the above description.

The process of the present invention provides for the continuous, on-line coating of hollow fibers to make semi-permeable, composite hollow fiber membranes which can be used in a variety of gas and/or liquid separation processes. Polymeric coating solutions having high viscosities and low solids content can be applied in a single step to make generally defect-free coated composite membranes. The present process is also advantageous in that the coating thickness can be controlled by simply changing the mechanical design of the coating die.

The following example illustrates the present invention and is not meant to be limiting.

EXAMPLE 1

Several runs in accordance with the process of the present invention were carried out to apply coatings of poly(trimethylsilylpropyne) on polypropylene microporous hollow fibers (CELGARD®X-20) to make composite hollow fiber membranes. The X-20 CELGARD® hollow fibers of approximate outside diameter of 0.45 mm were continuously unwound from a spool at a speed of 7 to 10 ft/min and at a static tension of 7 g. The hollow fibers were continuously drawn through a 3.0% W/W solution of poly(trimethylsilylpropyne) in THF or cyclohexane of a viscosity of about 6,000 to 8,000 cp. The hollow fibers passed through the jets of an orifice opening varying from 0.7 to 1.4 mm giving a ratio of fiber outside diameter to orifice inside diameter varying from 0.32 to 0.64. These films, upon drying, resulted in uniform dry coatings having thicknesses which depended on the diameter of the coating jet and concentration of the coating solution.

Microscopic examination of the coated composite membranes showed generally uniform and defect-free coatings on the hollow fiber substrates. Examination of cross-sections of the fibers showed that the total coating thicknesses varied from 2.4 to 7.8 μm for the different tests. Results of these runs are reported in Table 1 below.

TABLE 1

Experimental Coating Data

| Orifice Size mm | k* | Coating Thickness (dry) μm |
|---|---|---|
| 3% W/W Poly(trimethylsilylpropyne) in cyclohexane | | |
| 0.7 | 0.64 | 2.4 |
| 1.0 | 0.45 | 3.7 |
| 1.2 | 0.37 | 7.0 |
| 1.4 | 0.32 | 7.8 |
| 3% W/W Poly(trimethylsilylpropyne) in THF | | |
| 0.7 | 0.64 | 2.9 |
| 1.0 | 0.45 | 3.2 |
| 1.2 | 0.37 | 5.8 |
| 1.4 | 0.32 | 7.3 |

*$k = \frac{R_1}{R_o} = \frac{\text{Outside Radius of Substrate}}{\text{Inside Radius of Coating Jet}}$

EXAMPLE 2

Coated composite hollow fiber membranes were made in accordance with the present invention using a coating of poly(trimethylsilylpropyne) (PTMSP) on polypropylene microporous hollow fibers (CELGARD ®X-20). The coated membranes were potted in several modules wherein both ends of the composite hollow fibers were secured in an adhesive; such as polyurethane, EPOXY ®, etc., and the potted ends were cut open with a sharp blade making the fiber bores accessible so that the permeating gases could be withdrawn and their flux through the membrane measured. The oxygen permeance and the $O_2/N_2$ permeance ratio (selectivity) for the modules are reported in Table 2 below.

TABLE 2

PTMSP Coated CELGARD ® Hollow-Fiber Membranes

| Module # | Coating Thickness, μm | P/l$_{O_2}$ × 10$^5$* | α$O_2/N_2$** |
|---|---|---|---|
| 1 | 11.3 | 59.2 | 1.55 |
| 2 | 11.6 | 52.7 | 1.43 |
| 3 | 13.2 | 68.8 | 1.50 |
| 4 | 16.2 | 61.9 | 1.50 |
| 5 | 14.0 | 38.8 | 1.55 |
| 6 | 12.7 | 89.0 | 1.23 |
| 7 | | 95.9 | 1.46 |

*P/l, permeance in Scc/(cm$^2$) (sec) (cmHg)
**α$O_2/N_2$ = (P/l)$_{O_2}$/(P/l)$_{N_2}$ The results above show that, for all the modules the $O_2/N_2$ selectivity was measured to be from 1.23 to 1.55.

EXAMPLE 3

Microporous polysulfone hollow fiber membranes of approximate ID and OD of 0.5 and 0.8 mm were coated with PTMSP to make coated composite hollow fiber membranes using the process of the present invention. Three polymer solutions, 2.5%, 3.5%, and 4.0% by weight PTMSP in cyclohexane were used as coating solutions. The internal diameter of the coating jet was 2 mm. The coated fibers were potted to make hollow fiber modules of shell and tube type configuration. The coating thicknesses and gas permeability data are summarized in Table 3 below.

TABLE 3

| Coating Solution (% PTMSP) | Coating Thickness (μm) | P/l$_{O_2}$ × 10$^5$* | α$O_2/N_2$** |
|---|---|---|---|
| 2.5 | 8.8 | 259 | 1.20 |
| 3.5 | 6.2 | 321 | 1.28 |
| 4.0 | 6.5 | 287 | 1.27 |

*P/l, permeance in Scc/(cm$^2$) (sec) (cmHg)
**α$O_2/N_2$ = (P/l)$_{O_2}$/(P/l)$_{N_2}$ The unexpectedly high permeation rates of oxygen are attributed to the non-penetration of PTMSP into the micropores of the polysulfone substrate.

EXAMPLE 4 (COMPARATIVE)

A 1.75% by weight solution of PTMSP was made in toluene and spread on a glass plate to form uniform polymer films. Gas permeability for the films was measured using CSC-135 Permeation Cell. The oxygen and nitrogen gas permeance for two samples are reported in Table 4 below.

| Sample | P/l$_{O_2}$ × 10$^5$* | P/l$_{N_2}$ × 10$^5$* | α$O_2/N_2$** |
|---|---|---|---|
| 1 | 72.5 | 47.9 | 1.5 |
| 2 | 295.8 | 201.9 | 1.5 |

*P/l, permeance in Scc/(cm$^2$) (sec) (cmHg)
**α$O_2/N_2$ = (P/l)$_{O_2}$/(P/l)$_{N_2}$ The results above show that the $O_2/N_2$ selectivity for this polymer is about 1.5. Accordingly, a defect-free coating made of this polymer on a microporous substrate should also have an $O_2/N_2$ selectivity of about 1.5; which, in fact was observed in Examples 2 and 3 above.

EXAMPLE 5

Examples 1-3 above illustrate an embodiment of the present invention in which a hollow fiber was continuously coated to make a coated composite membrane wherein the hollow fiber was passed through a single polymer reservoir and coating die. In this example, an embodiment was employed wherein a double coating was applied to the same fiber in a continuous fashion. The hollow fiber was passed through a series of two polymer reservoirs in which the diameters of the associated coating dies increased in succession, thereby allowing two coating layers to be applied to the hollow fiber. The solvent and concentration of PTMSP, the sequence and size of the orifices used and the coating thicknesses obtained are reported in Table 5 below.

TABLE 5

| Solvent | % PTMSP (w/w) | ORIFICE SIZE (mm) 1st | ORIFICE SIZE (mm) 2nd | Coating Thickness (μm) |
|---|---|---|---|---|
| Cyclohexane | 3.0 | 1.0 | 1.4 | 22.0 |
| Cyclohexane | 3.0 | 1.0 | 1.4 | 11.4 |
| Cyclohexane | 3.0 | 1.0 | 1.4 | 11.0 |
| Cyclohexane | 3.0 | 1.0 | 1.2 | 15.5 |
| THF | 4.0 | 1.0 | 1.2 | 14.5 |

Having thus described the present invention, what is now deemed appropriate for the Letter patent is set out in the following appended claims.

What is claimed is:

1. A continuous process for applying a generally uniform, semi-permeable coating on a hollow fiber substrate to produce a coated composite hollow fiber membrane, said process comprising:
    (a) passing a hollow fiber substrate suitable as a component of said membrane, at both fixed tension and speed, into a polymeric solution capable of forming a semi-permeable coating on the hollow fiber substrate;

(b) removing said hollow fiber substrate from the polymeric solution by axially drawing said substrate through a coating die having a circular annulus such that a polymer solution coating is formed on the substrate surface by axial annular drag flow; and (c) drying said coated hollow fiber by passing it through a convective flow tunnel in which the rate of drying is controlled both by a pre-determined temperature profile within the tunnel and by a controlled air flow rate through the tunnel.

2. A process in accordance with claim 1 wherein said polymeric solution contains less than about 15% solids.

3. A process in accordance with claim 1 wherein said polymer solution coating on the hollow fiber substrate, after drying, has a thickness between 0.1–100 microns.

4. A process in accordance with claim 1 wherein said pre-determined temperature profile within the convective flow tunnel is controlled by a heating device encasing a portion of the tunnel.

5. A process in accordance with claim 4 wherein said heating device encases a portion of said convective flow tunnel which is downstream in relation to the directional movement of the fiber through the tunnel.

6. A process is accordance with claim 5 wherein said controlled air flow through the convective flow tunnel is counter directional to the hollow fiber.

7. A process in accorance with claim 6 wherein said controlled air flow enters the convective flow tunnel at a point such that said air flow is heated by said heating device prior to contacting the hollow fiber.

8. A process in accordance with claim 1 wherein said polymeric solution comprises a solvent containing a polymeric material selected from the group consisting of polysulfones, polyacrylonitriles, polycarbonates, polyacetylenes polyarylethers, polyolefins, and substituted derivatives thereof.

9. A process in accordance with claim 1 wherein said polymeric solution has a viscosity between 100–25,000 centipoise at room temperature.

10. A process in accordance with claim 1 wherein said hollow fiber substrate is a microporous polymeric material.

11. A process in accordance with claim 1 wherein said hollow fiber substrate is initially unwound at a fixed tension and speed from a spool in a continuous, on-line process.

12. A process in accordance with claim 1 wherein said coated hollow fiber substrate is removed from the convective flow tunnel and continuously wound on a take-up spool.

13. A process in accordance with claim 1 which further comprises passing said hollow fiber substrate through a series of polymeric solutions and coating dies, wherein each successive coating die has an equal or larger diameter than the previous coating die, such that a plurality of coating layers are formed on the hollow fiber substrate.

14. A process in accordance with claim 13 wherein the coated hollow fiber is dried after passing through each coating die.

15. A process in accordance with claim 13 wherein the coated hollow fiber is dried only after passing through all of the successive coating dies.

16. A process in accordance with claim 13 wherein each polymeric solution contains a different polymer concentration.

17. A process in accordance with claim 13 wherein each polymeric solution contains a different polymer material.

* * * * *